United States Patent [19]
Yakubow

[11] 3,866,947
[45] Feb. 18, 1975

[54] REMOVABLE GOOSENECK LOW BOY TRAILER

[75] Inventor: Michael J. Yakubow, Church Hill, Md.

[73] Assignee: Centreville Tag-A-Long Trailers, Inc., Centreville, Md.

[22] Filed: Apr. 26, 1973

[21] Appl. No.: 354,752

[52] U.S. Cl............................................ 280/425 A
[51] Int. Cl............................................ B62d 53/06
[58] Field of Search ................... 280/423 B, 425 A

[56] References Cited
UNITED STATES PATENTS

| | | | |
|---|---|---|---|
| 2,953,396 | 9/1960 | Meadows | 280/425 A X |
| 2,967,720 | 1/1961 | Smith et al | 280/425 A |
| 3,429,585 | 2/1969 | Ross | 280/425 A |
| 3,517,945 | 6/1970 | Fikse | 280/425 A |
| 3,698,582 | 10/1972 | Weinmann | 280/425 A X |

Primary Examiner—Leo Friaglia
Assistant Examiner—R. Schrecengost
Attorney, Agent, or Firm—Graybeal, Barnard, Uhlir & Hughes

[57] ABSTRACT

A hydraulic gooseneck trailer assembly, with the gooseneck and trailer bed being detachably connected. At the forward end of the trailer assembly are two pairs of interlocking main coupling hooks. Raising and lowering of the trailer assembly is accomplished by unitized hydaulic ram means operating between the gooseneck and the trailer bed at a location rearwardly of the coupling hooks location. A pair of thrust load bearing blocks and a pair of safety hooks are engaged between the gooseneck and trailer to maintain them in proper operating position. A pair of coupling lock pins maintain the main coupling hooks in proper interconnecting relationship, and a retractable safety pin maintains an interconnect between the hydraulic ram means of the gooseneck and the trailer bed. The ram means provides positive lock of thrust load bearing blocks in load bearing position during normal operation. The control means for the components of the trailer assembly are conveniently placed on one side of the assembly for safe operation.

12 Claims, 13 Drawing Figures

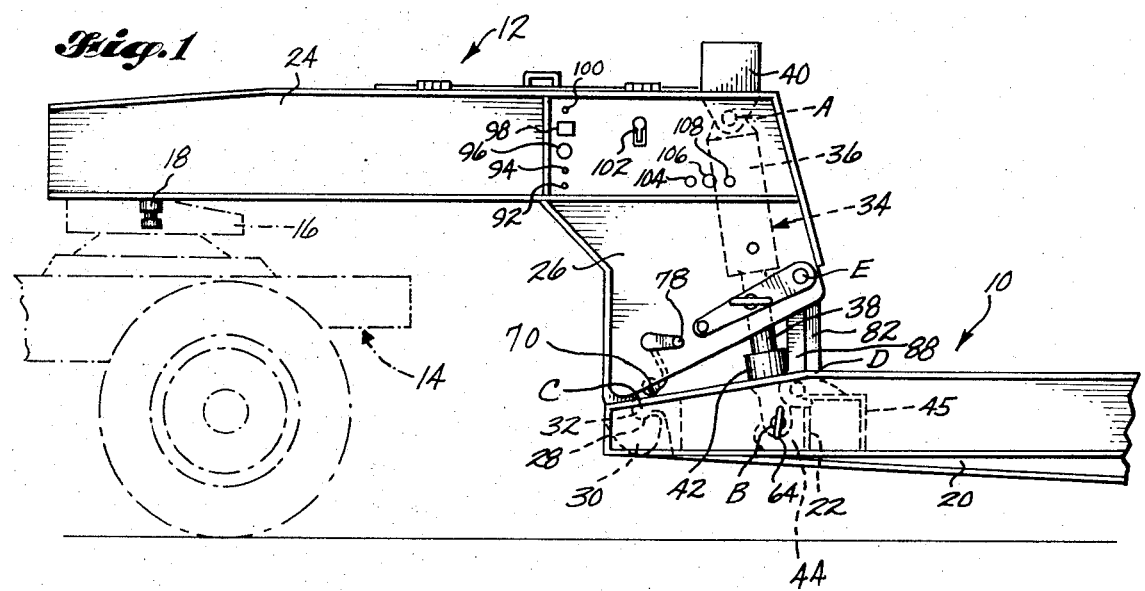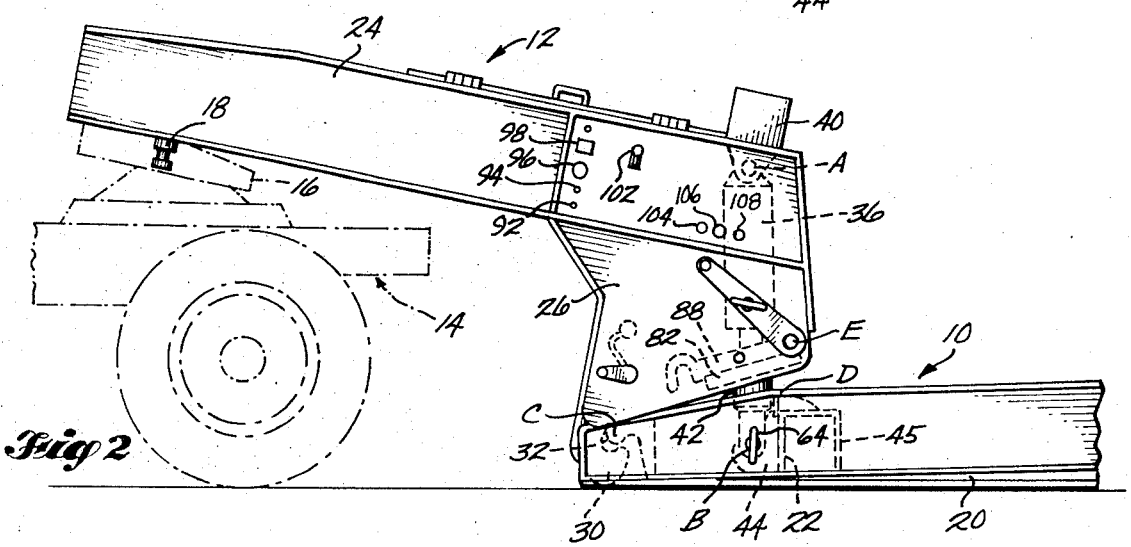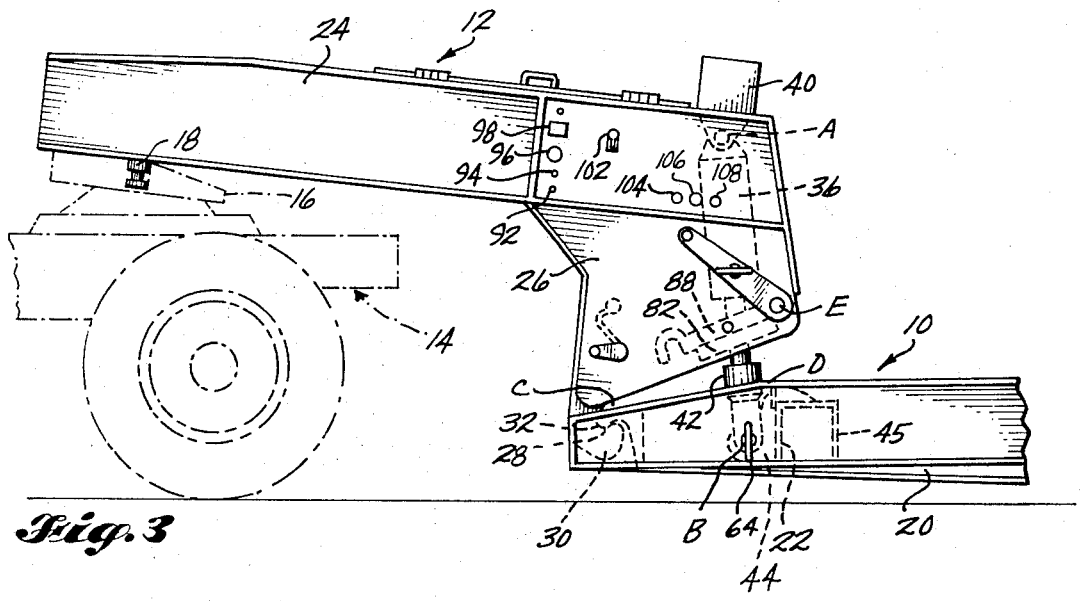

3,866,947

REMOVABLE GOOSENECK LOW BOY TRAILER

BACKGROUND OF THE INVENTION

1. Field of the Invention

The present invention relates to gooseneck trailer assemblies, and more particularly to such trailer assemblies where the gooseneck is detachable from the trailer bed and hydraulically operated for raising and lowering thereof and for convenient, safe connect and disconnect.

2. Description of the Prior Art

U.S. Pat. No. 3,517,945, Fikse, shows a detachable gooseneck, wherein the gooseneck is connected to the trailer bed by a forward set of coupling hooks, and has a thrust ram rearwardly of the coupling hooks to provide for relative rotation of the gooseneck and trailer bed, for the purpose of raising and lowering the same. However, the assembly as shown in lacking in additional interlocking and thrust bearing means for increased safety and operating effectiveness of the trailer assembly. Other patents showing trailer assemblies having a pivotal interconnection, with hydraulic means to cause relative rotation of the components are: Meadows, U.S. Pat. No. 2,953,396; Smith et al, U.S. Pat. No. 2,967,720; Ross, U.S. Pat. No. 3,429,585; and Talbert, U.S. Pat. No. 3,536,340.

Also, in the prior art, there are various trailer assemblies which utilize ground engaging hydraulic means for operation of a gooseneck trailer assembly. Representative of these are: Clark, U.S. Pat. No. 2,844,265; Swaney, U.S. Pat. No. 2,895,746; Moiriat et al., U.S. Pat. No. 3,384,390; and James, U.S. Pat. No. 3,419,179.

Other patents generally relating to trailer assemblies are: Duffy, U.S. Pat. No. 2,822,945; Hill, U.S. Pat. No. 2,944,834; Duffy, U.S. Pat. No. 3,027,030; Martin, U.S. Pat. No. 3,030,126; Kulyk, U.S. Pat. No. 3,093,388; Talbert, U.S. Pat. No. 3,215,449; Martin, Jr., U.S. Pat. No. 3,307,719; Kulyk, U.S. Pat. No. 3,330,574; Barnaby, U.S. Pat. No. 3,424,323; Cramer et al., U.S. Pat. No. 3,450,417; Jahn et al., U.S. Pat. No. 3,498,636; and Stafford, Jr., U.S. Pat. No. 3,645,559.

SUMMARY OF THE INVENTION

In the gooseneck trailer assembly of the present invention, there is a trailer bed detachably connected to a gooseneck through main detachable coupling means at the forward end of the trailer bed. The trailer bed and gooseneck are relatively rotatable about the axis of the coupling means, such rotation being accomplished by hydraulic ram means acting between the gooseneck and the trailer bed at a location spaced rearwardly of the coupling means.

With the trailer assembly in its operating position for towing, thrust load bearing means, desirably in the form of blocks, are positioned between the gooseneck and the trailer bed rearwardly of the main coupling means, to take substantial thrust or compression loads between the gooseneck and trailer bed at that position so as to form a force couple with the coupling means and maintain the gooseneck and trailer bed in their proper relative position. There is a detachable connection in the form of a retractable pin to connect the ram means to the trailer bed, and with the blocks in their thrust bearing position, the ram means is pressurized to retract and apply a force between the gooseneck and the trailer bed through the thrust blocks for additional safety and reliability under travel induced vibrations and shocks. Further, a pair of safety hooks provide an interconnection between the gooseneck and the trailer bed in the same area as the thrust blocks. In the preferred embodiment, both the safety hooks and the thrust blocks are rotatably mounted to a common shaft or can be made as a unitary member to be moved simultaneously into and out of their operating position. Retractable lock pins are provided for the main coupling hooks to maintain them in proper interfitting relationship with the trailer assembly in its operating condition. Other features of the present invention will be apparent from the following detailed description.

BRIEF DESCRIPTION OF THE DRAWINGS

FIG. 1 is a side elevational view of the apparatus of the present invention in a coupled position ready for operation;

FIG. 2 is a view similar to FIG. 1, but with the apparatus in a position for coupling or uncoupling;

FIG. 3 is a view similar to FIGS. 1 and 2, but with the trailer in a lowered position for travel under an obstruction such as a low bridge;

DESCRIPTION OF THE PREFERRED EMBODIMENT

Figure 6:
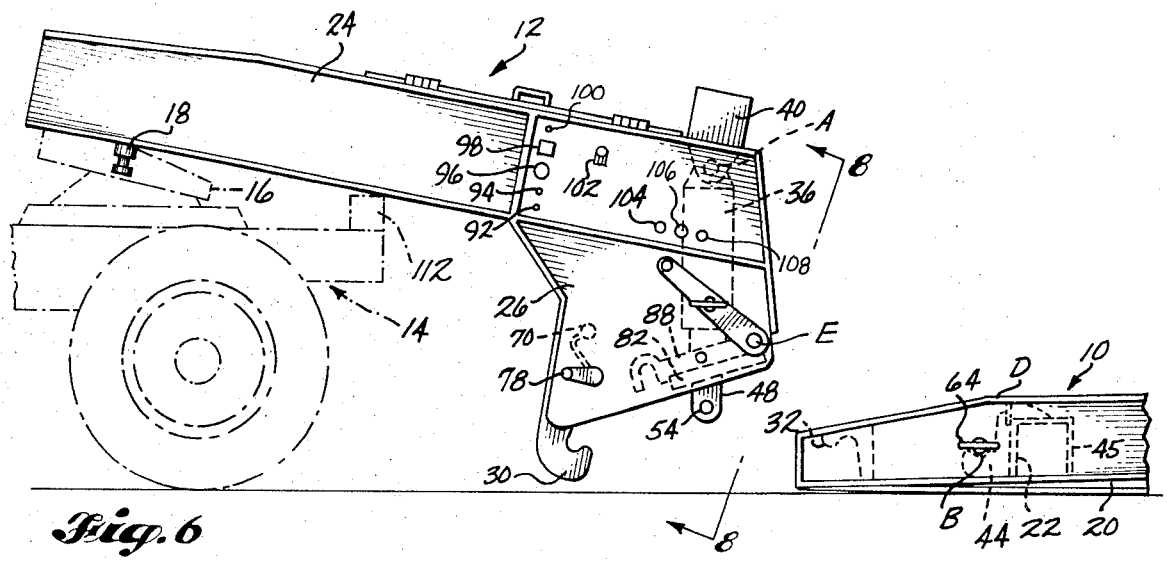
FIG. 6 is a view similar to FIGS. 1-4, but showing the trailer bed and gooseneck disconnected.
Figure 7:
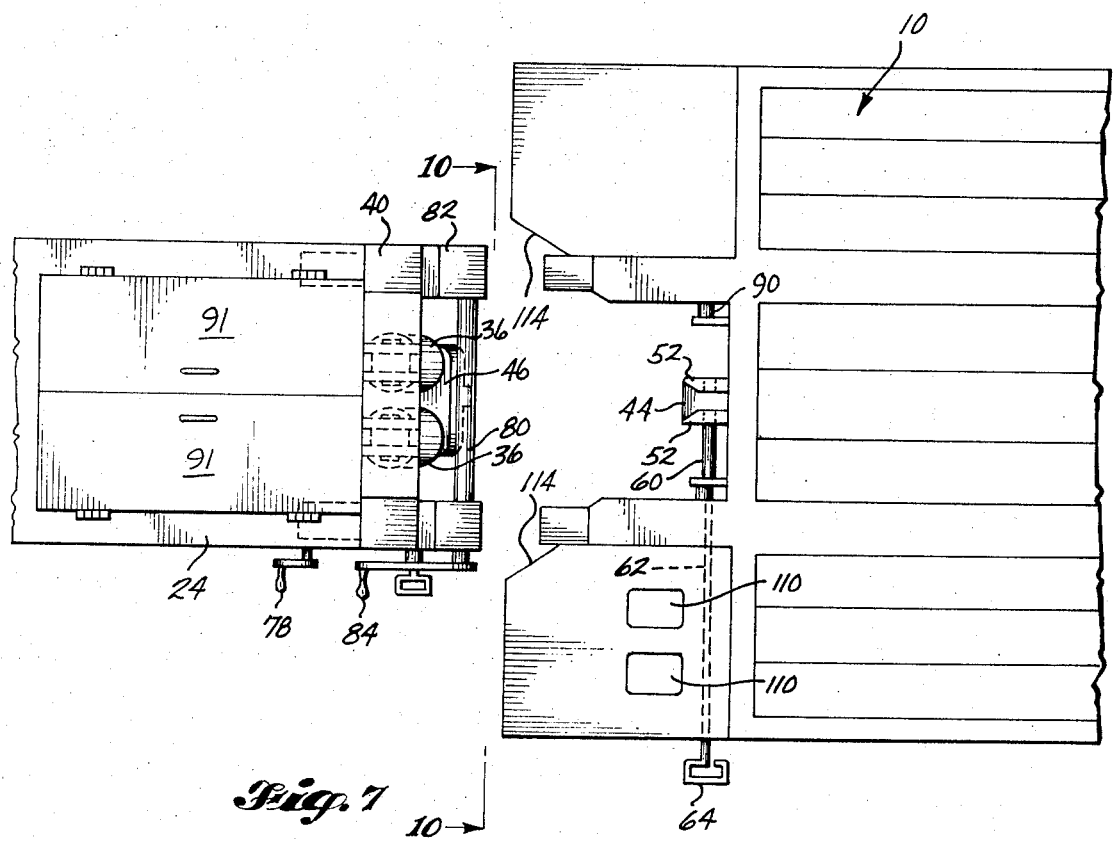
FIG. 7 is a top plan view of the apparatus as shown in FIG. 6.

The gooseneck trailer assembly of the present invention is especially adapted to carry large mobile equipment, and comprises a low level trailer frame or bed 10 and a gooseneck 12, the trailer bed 10 having rearwardly placed traveling wheels. While these rear wheels are not shown for convenience of illustration, it should be indicated that the rear wheels are mounted to the trailer by leaf springs to permit vertical movement of the rear wheels relative to the trailer bed. The gooseneck 12 is detachably connected to a tractor 14 through conventional means, which is shown as comprising a fifth wheel plate 16 and a king pin 18 at the forward end of the gooseneck 12. The gooseneck 12 and trailer bed 10 also are detachably interconnected. This interconnection is such that the gooseneck 12 can conveniently remain attached to the trailer bed 10 apart from the tractor 14, or can readily be carried away from the trailer bed 10 by the tractor 14, as shown in FIG. 6. The purpose of so removing the gooseneck 12 from the trailer bed 10 is to permit equipment to be loaded and unloaded over the front end of the trailer bed 10, where the loading height can be as low as approximately six inches with the forward end of the trailer bed 10 resting on the ground.

The trailer bed 10 comprises two main longitudinal I beams 20, interconnected by suitable cross members, a forward one of which is shown at 22. The gooseneck 12 comprises a forwardly extending frame portion made up of two rigidly interconnected main longitudinal T beams 24, and a rear portion made up of two upright members 26 rigidly connected to and depending from the rear end of the two I beams 24.

The main coupling or interconnect between the gooseneck 12 and the trailer bed 10 through which the main towing forces are transmitted through the gooseneck 12 to the trailer bed 10 is indicated at 28 and comprises a pair of laterally spaced upturned gooseneck hooks 30 at the lower front end of the gooseneck upright members 26 and two matching downwardly turned bed hooks 32 at the extreme forward end of the trailer bed 10. To cause relative rotational movement of the gooseneck 12 and trailer bed 10, there are a pair of laterally spaced hydraulic rams 34, each comprising an upper cylinder 36 and a lower piston rod 38. The upper end of the cylinder 36 of each ram 34 is pivotally connected to an anchoring member 40 which is a cross member at the upper rear end of the gooseneck 12. The lower ends of the two piston rods 38 are rigidly connected to a common T-bar yoke 42 through which thrust loads are transmitted from the rear end of the gooseneck 12 into the trailer bed 10 at a location rearwardly of the main interconnect 28. The T-bar yoke 42 being rigidly connected to the piston rods 38 provides a unitized ram means with equal force being applied by the two hydraulic rams 34 substantially as a single thrust force through the T-bar yoke 42 to the trailer bed 10.

Figure 12:
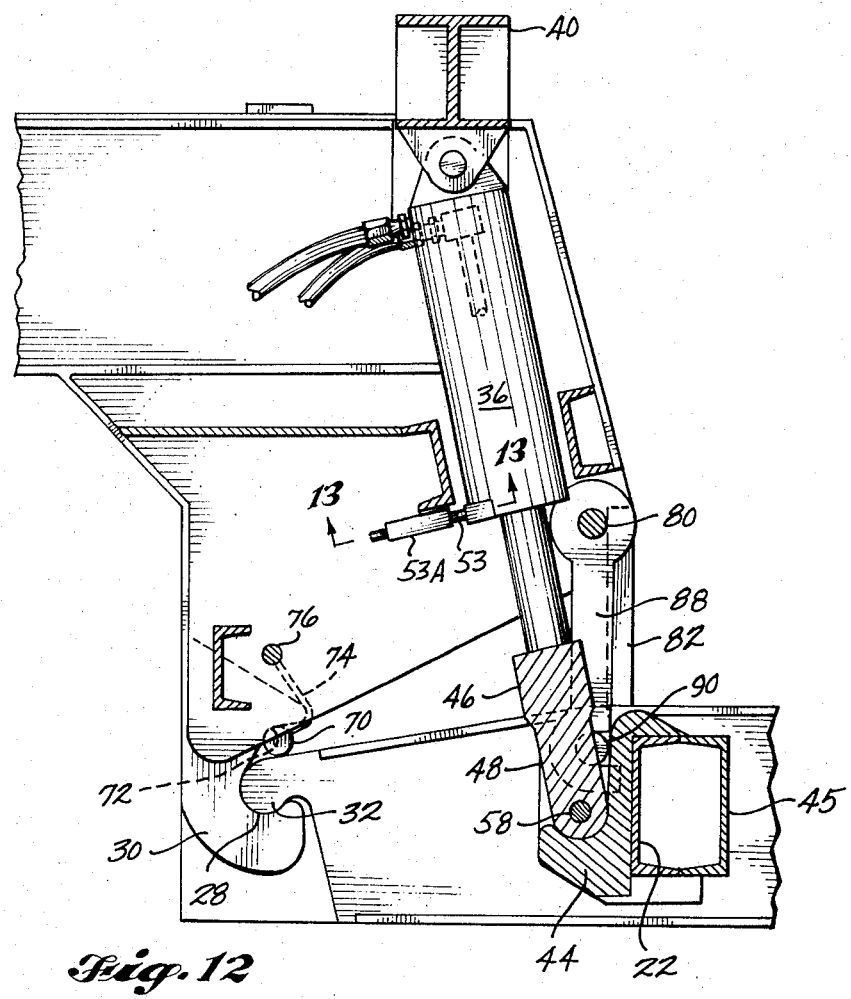
FIG. 12 is an enlarged sectional view taken along line 12—12 of FIG. 5.

To anchor the T-bar yoke 42, there is a yoke pocket member 44 at the center portion of the aforementioned front cross member 22 of the trailer bed 10. This cross member 22 is a heavy gauged channel, and as shown in FIG. 12 has at its middle portion a second channel 45 joined thereto to form a boxed member of sufficient strength to withstand the very substantial thrust loads transmitted into the yoke pocket 44 by the hydraulic ram means 34. The action of the ram means 34 in conjunction with the main interconnect 28 provides a force couple by which the gooseneck 12 is rotated about the transverse horizontal rotational axis at the interconnect 28, to raise or lower the trailer assembly as illustrated in FIGS. 1-4.

Figure 8:
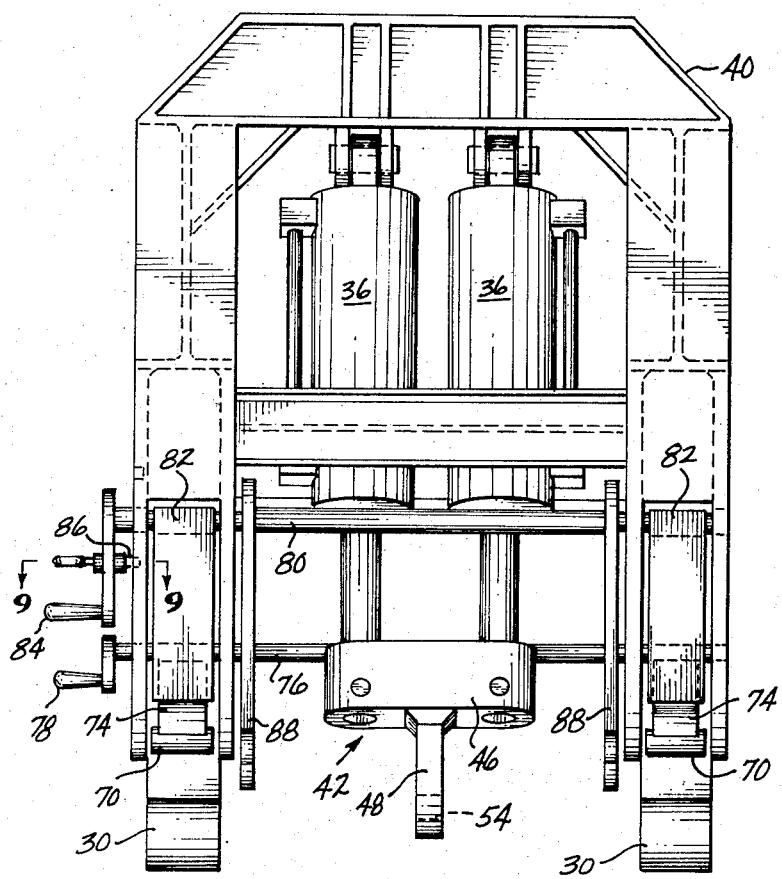
FIG. 8 is a view taken from the location of line 8—8 of FIG. 6.
Figure 9:
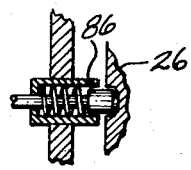
FIG. 9 is a sectional view taken along line 9—9 of FIG. 8.
Figure 10:
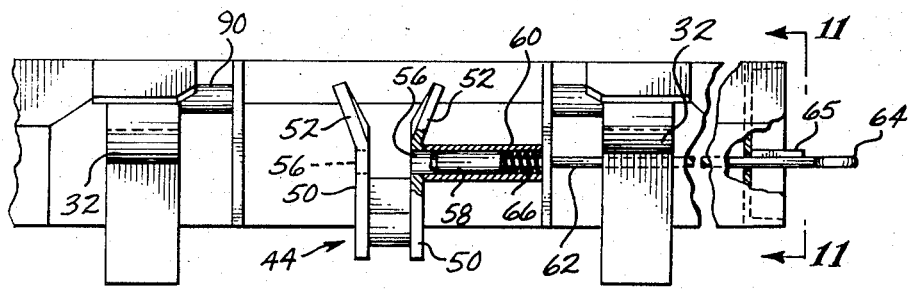
FIG. 10 is a view taken from the location of line 10—10 of FIG. 7.
Figure 13:
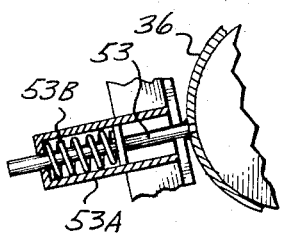
FIG. 13 is a further enlarged sectional view taken along line 13—13 of FIG. 12.

With reference particularly to FIGS. 8 and 10, it can be seen that the T-bar yoke 42 comprises a cross member 46 rigidly connected to the two piston rods 38, and a depending thrust member 48 rigidly attached to the cross member 46. The yoke pocket 44 comprises two side plates 50, the upper ends of which are slanted outwardly at 52 to form a diverging entryway to guide the yoke thrust member 48 into the pocket 44. As shown in FIGS. 12 and 13, there is a spring loaded positioning finger 53 mounted to the gooseneck 12 to engage one of the rams 34 to insure the T-bar yoke is properly positioned for entry into the pocket 44. This finger 53 is mounted in a sleeve 53A and urged by a compression spring 53B in the sleeve 53A to its proper locating position.

Figure 11:
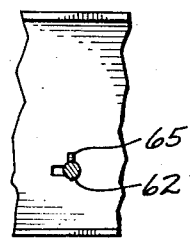
FIG. 11 is a view taken along line 11—11 of FIG. 10.

At the lower end of the yoke thrust member 48 is a transverse through hole 54 which, with the thrust member 48 positioned in the pocket 44, is in alignment with through holes 56 in the two yoke pocket plates 50. These aligned holes 54-56 receive a T-bar yoke safety pin 58. The pin 58 has a retracted position in a sleeve or guide 60 connected to one of the yoke plates 50 and extending laterally therefrom in alignment with the holes 56. A rod 62 is connected to the pin 58 and extends outwardly to terminate in a pull handle 64 at one side of the trailer bed 10. A compression spring 66 mounted in the guide 60 urges the pin 58 into its engaged position where it extends through the yoke pocket 44 and yoke 42. The rod 62 has a catch member 65 (see FIG. 11) by which the pin 58 can be held in its retracted position in the guide 60. The center axis of the holes 54-56 and pin 58 is coincident with the pivot axis of the yoke bar thrust member 48 in the yoke pocket 44 so as to permit a limited degree of rotation between these two members.

With reference to FIG. 12, there are two main coupling lock pins 70, each of which interfits with a related pair of coupling hooks 30 and 32 to maintain them in proper interlocking relationship when the trailer assembly is in its operating position, as shown in FIG. 1. Specifically, each lock pin 70 fits in a recess 72 formed at the base portion of the gooseneck hook 30, and in this position bears against the upper surface of the bed hook 32, thus preventing any vertical separation of its related pair of hooks 30 and 32. The two lock pins 70 are connected by means of related arms 74 to a common horizontal transverse shaft 76 mounted to the gooseneck upright members 26. A handle 78 on the side of the gooseneck is connected to the shaft 76 to rotate the lock pins 70 into and out of their locking position.

Mounted to a second shaft 80 at the rear of the gooseneck 12 are two laterally spaced thrust load bearing members or blocks 82 which function to transmit thrust loads between the trailer bed 10 and the rear portion of the gooseneck 12 when the trailer assembly is in its operating position shown in FIG. 1. The thrust blocks 82 are moved into and out of their operating position by means of a crank handle 84 connected to the shaft 80 and positioned on one side of the gooseneck 12. As shown more clearly in FIG. 8, there is mounted in the handle 84 a spring loaded lock finger 86 which fits into one mating recess in its related upright gooseneck member 26 to hold the crank handle 84 in position when the thrust blocks 82 are in their operating position.

Also, mounted to the thrust block shaft 80 and extending radially therefrom are two laterally spaced safety hooks 88, each of which is positioned just inwardly of a related thrust block 82. Each safety hook 88 engages a respective one of the two safety hook pins 90 mounted to the trailer bed 10 and positioned on opposite sides of and slightly above the yoke pocket 44. When the crank handle 84 is pushed downwardly to the position shown in FIG. 1 and also in FIG. 8, the thrust blocks 82 are in place to bear against the trailer frame 10, and the safety hooks 88 are in engagement with their related pins 90. (It will be noted that in FIG. 6 the thrust blocks 82 and safety hooks 88 are swung upwardly to an out-of-the-way location. However, for purposes of illustration, in FIG. 8, these components are shown in their downwardly extending position.) As will be disclosed more particularly hereinafter, these safety hooks 88 and pins 90 function to keep the removable gooseneck from falling forward when in a parked position, with the towing tractor 14 removed from the gooseneck 12. In addition, they are in locking position with the trailer in its traveling condition for safety and to resist effects of shock and vibrations.

A hydraulic pump to supply fluid to the rams 34 and a small internal combustion engine to power this pump are located in the upper rear portion of the gooseneck 12 beneath cover doors 91, but are not shown for convenience of illustration. It will be noted that all of the aforementioned operating handles 64, 78 and 84 are conveniently positioned on the left side of the trailer assembly. In like manner, the other control components which require access for the operation are positioned on the left side of the trailer assembly, specifically at the upper portion of the left upright member 26. These are given numerical designations as follows: An engine throttle control 92; an engine start button 94; an ammeter 96; a hydraulic pressure gauge 98; an engine off-on switch 100; a hydraulic control lever 102 for the rams 34; a service air oulet 104 for trailer air brakes; an electrical outlet 106 for running lights and stop lights; and an emergency air oulet 108 to unlock the trailer brakes in the event accidental decoupling occurs. Storage compartments 110 for air and electrical lines are provided at the forward left portion of the trailer 10.

To describe the operation of the present invention, reference is now made to FIG. 1, which shows the trailer assembly in its operating condition for over the road travel. The key operating points for the trailer assembly are indicated at A, B, C, D, and E.

In the operating position shown in FIG. 1, points C, D and E are the major force transmitting locations. The coupling interconnect 28 at C transmits the main longitudinal towing forces between the gooseneck 12 and the trailer 10. In addition, the coupling 28 at C functions as one point in a force couple to maintain the gooseneck 12 and trailer bed 10 in their proper relative positions. The other force vector of this force couple is transmitted by the thrust blocks 82 at point E in the rear of the gooseneck 12 to point D, which is a bearing surface of the trailer bed 10 at a location spaced rearwardly of point C. Hydraulic pressure is supplied to the bottom side of the cylinders 36 of the rams 34 to tend to retract the rods 38, thus creating a hydraulic lock between the gooseneck 12 and trailer bed 10, with the lock pin 58 making a positive connection between the T-bar yoke 42 and the yoke pocket 44. Overall this creates a positive link from the yoke pocket 44 in the trailer bed 10 to the hydraulic ram anchor member 40 in the gooseneck 12, the effect being to hold the thrust blocks 82 snugly in place. Also, in the operating position of FIG. 1, the safety hooks 88 are in engagement with their related pins 90, and the lock pins 70 maintain the two main coupling hooks 30 and 32 in a snug interfitting relationship to prevent accidental release.

In FIG. 2, the trailer assembly is shown in a lowered position for coupling or uncoupling. The procedure in going from the operating position of FIG. 1 to the uncoupled position of FIG. 2 is now described. In this operation the critical force transmitting locations are at A, B and C. First, the safety pin handle 64 is pulled and locked open to withdraw the safety pin 58 to disconnect the T-bar yoke 42 from the yoke pocket 44. Next, the control lever 102 for the hydraulic ram 34 is maneuvered to deliver hydraulic pressure fluid into the dram 34 to lift the thrust blocks 82 slightly clear of their seating points on the main I beam 20. When this is accomplished, the lock finger 86 is retracted, and the crank handle 84 swung upwardly to pivot the thrust blocks 82 and safety hooks 88 upwardly, after which the lever 84 is again locked in position by means of the lock finger 86 fitting in an upper mating hole.

Figure 4:
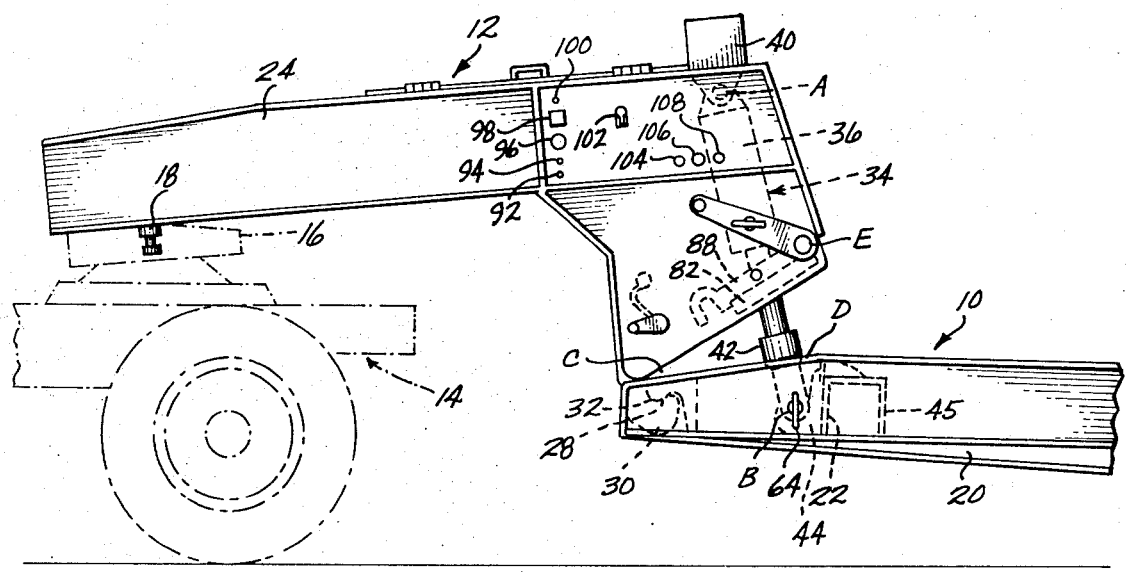
FIG. 4 is a view similar to FIGS. 1-3, with the trailer in a raised position for travel over an obstacle such as raised railroad tracks.
Figure 5:
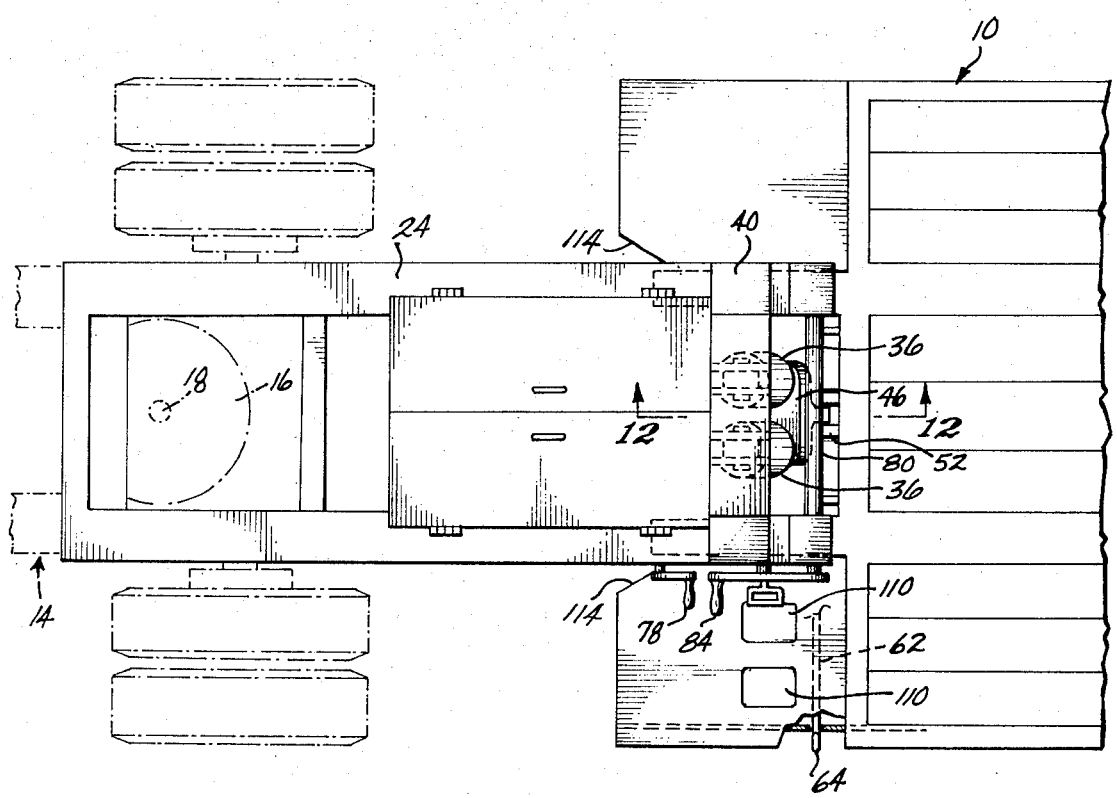
FIG. 5 is a top plan view of the apparatus of the present invention in the position of FIG. 1.

After this, the hydraulic ram 34 is extended further to cause further rotation of the gooseneck 12 with respect to the bed 10, until the position shown in FIG. 4 is reached. Then the two lock pins 70 are withdrawn from engagement with the hooks 30–32 by swinging the pins upwardly by means of the crank handle 78. Then the hydraulic pressure in the ram 34 is reversed, allowing hydraulic pressure to subside in the bottom chamber of each of the cylinders 36, thus slowly lowering the gooseneck 12 and the trailer frame 10 to the ground, as shown in FIG. 2. As shown in FIG. 6, a removable support block 112 can be placed between the gooseneck I beam 24 and the frame of the towing vehicle 14 to keep the gooseneck 12 slightly above the ground level. If desired, this block 112 can be made a permanent part of the frame of the towing vehicle 14. Thereafter the tractor 14 carrying the gooseneck 12 can be moved away from the trailer bed 10, as shown in FIG. 6.

To reconnect the gooseneck 12 and trailer frame 10, the opposite procedure is followed. The tractor 14 is backed toward the trailer 10, with the coupling hooks 30–32 coming into position for engagement, as shown in FIG. 2. The forward end of the trailer frame 10 has a forwardly diverging entryway 114 to cause the hooks 30 to come into proper alignment with the hooks 32. In this position, the T-bar yoke 42 is in alignment with the yoke pocket 44. Fluid pressure is now supplied to the top chambers of the hydraulic cylinders 36, forcing the piston rods 38 downwardly, driving the T-bar yoke 42 into the pocket 44. The safety pin 58 is inserted to establish a positive interconnect between the T-bar yoke 42 and pocket 44, and further hydraulic pressure is applied to the cylinders 36 to move the gooseneck 12 and trailer bed 10 upwardly.

When the trailer bed 10 reaches a position (shown in FIG. 4) above its horizontal operating position the lock pins 70 are moved down into their locking position. Thereafter the hydraulic rams 34 are retracted to permit the gooseneck 12 and trailer frame 10 to descend. The handle 84 is moved downwardly to bring the thrust blocks 82 and safety hooks 88 down into engaging position, where they are locked in place. Then the fluid pressure in the rams 34 is reversed with moderate pressure being applied to tend to retract the rams 34, this providing a hydraulic interlock holding the thrust blocks 82 firmly in place. With this accomplished, the trailer assembly is ready for over the road travel. In a typical example, involving a 41 foot trailer having a 35 ton carrying capacity, a hydraulic system is employed with a maximum hydraulic fluid pressure of about 1,600 psi. In this equipment the recommended back pressure during road travel is 300–600 psi.

In the event the trailer assembly is approaching a low overhead obstruction, such as a low bridge, the assembly may be lowered moderately simply by releasing the back pressure in the rams 34, raising the bed slightly, then releasing the thrust blocks 82 and retracting the hydraulic rams 34 moderately, as shown in FIG. 3. Also, if a raised road obstruction is encountered, such as exposed railroad tracks, the safety hooks 88 and the compression blocks 82 can be released, and the trailer bed 10 raised to the position of FIG. 4, by extending the hydraulic rams 34. The positions of FIGS. 3 and 4 are intended only for travel over a short distance and at slow speed.

If its is desired to detach the tractor 14 from the gooseneck 12, with the gooseneck remaining attached to the trailer bed 10, the safety hook 88 can be engaged with the pins 90 to prevent the gooseneck 12 from falling forward. In addition to the use of the safety hooks 88, or as an alternate to their use, the T-bar yoke safety pin 58 can be engaged to lock the T-bar yoke 42 into the yoke pocket 44. Then by maintaining pressure on the lower chamber of the cylinder 36, the gooseneck 12 can not only be prevented from falling forward, but also can be moved upwardly or downwardly by retracting or extending the rams 34. In this situation blocks (not shown) or separate landing jacks must be placed under the trailer so it does not drop all the way to the ground.

Another way of decoupling, leaving the gooseneck 12 with the trailer 10, is hydraulically, i.e., by removing safety hooks 88 and thrust blocks 82, leaving pin 58 in place, then retracting the hydraulic ram 34 until the trailer bed 10 touches ground and all pressure is removed from the fifth wheel plate 16, as in FIG. 2. The fifth wheel king pin 18 is then released and the truck 14 can simply be driven off. For safety, the safety hooks 88 and thrust blocks 82 should then be returned to their operative positions (as in FIG. 1) so the gooseneck 12 is self-supported on the trailer 10 even if hydraulic pressure is lost.

What is claimed is:

1. In a trailer assembly including a trailer bed and a gooseneck, apparatus connecting one end of the trailer bed to the gooseneck, said apparatus comprising:
   a. detachable coupling means interconnecting said trailer bed and said gooseneck at a first forward location at the one end of said trailer bed,
   b. hydraulic ram means having a first end connected to said gooseneck at a second location spaced from said first location, and having a second force transmitting end,
   c. bearing means on said trailer bed adapted to detachably engage the second end of said ram means so as to receive a thrust force imparted by said ram means, said bearing means being positioned at a third location spaced rearwardly of said coupling location, whereby said ram means and said coupling means provide a force couple for relative rotation of said gooseneck to said trailer bed,
   d. thrust block means, independent of said ram means, being movable between a first position where said thrust block means is interposed between a rear portion of said gooseneck and a bearing surface of said trailer bed positioned rearwardly of said coupling means so as to be loaded in compression thereby, and a second position where said thrust block means is out of thrust engagement between said trailer bed and said gooseneck to permit relative rotation of said gooseneck and trailer bed to lower the trailer bed.

2. The apparatus as recited in claim 1, wherein there is a releasable connecting means between the second end of said hydraulic ram means and said trailer bed, wherein, with said thrust block means in its first position, retraction of said ram means provides a hydraulic lock between said gooseneck and said trailer bed, with said thrust block means resisting further retraction of said ram means.

3. In a trailer assembly including a trailer bed and a gooseneck, apparatus connecting one end of the trailer bed to the gooseneck, said apparatus comprising:
   a. detachable coupling means interconnected said trailer bed and said gooseneck at a first forward location at the one end of said trailer bed,
   b. hydraulic ram means having a first end connected to said gooseneck at a second location spaced from said first location, and having a second force transmitting end,
   c. bearing means on said trailer bed adapted to detachably engage the second end of said ram means so as to receive a thrust force imparted by said ram means, said bearing means being positioned at a third location spaced rearwardly of said coupling location, whereby said ram means and said coupling means provide a force couple for relative rotation of said gooseneck to said trailer bed,
   d. thrust bearing means, independent of said ram means, being movable between a first position where said thrust bearing means exerts a thrust force between a rear portion of said gooseneck and a bearing surface of said trailer bed positioned rearwardly of said coupling means, and a second position where said thrust bearing means is out of thrust engagement between said trailer bed and said gooseneck to permit relative rotation of said gooseneck and trailer bed to lower the trailer bed,
   e. releasable connecting means between the second end of said hydraulic ram means and said trailer bed, wherein, with said thrust bearing means in its first position, retraction of said ram means provides a hydraulic lock between said gooseneck and said trailer bed, with said thrust bearing means resisting further retraction of said ram means, and
   f. said apparatus being further characterized in that said bearing means comprises a pocket member and said ram means has a bearing member to engage said pocket member, said bearing member and pocket member having aligned through openings located at an axis of rotation of said bearing member with respect to said pocket member, said releasable connecting means comprising a pin means insertable through said openings.

4. In a trailer assembly including a trailer bed and a gooseneck, apparatus connecting one end of the trailer bed to the gooseneck, said apparatus comprising:
   a. detachable coupling means interconnecting said trailer bed and said gooseneck at a first forward location at the one end of said trailer bed,
   b. hydraulic ram means having a first end connected to said gooseneck at a second location spaced from said first location, and having a second force transmitting end,
   c. bearing means on said trailer bed adapted to detachably engage the second end of said ram means so as to receive a thrust force imparted by said ram means, said bearing means being positioned at a third location spaced rearwardly of said coupling location, whereby said ram means and said coupling means provide a force couple for relative rotation of said gooseneck to said trailer bed, d. thrust bearing means, independent of said ram means, being movable between a first position where said thrust bearing means exerts a thrust force between a rear portion of said gooseneck and a bearing surface of said trailer bed positioned rearwardly of said coupling means, and a second position where said thrust bearing means is out of thrust engagement between said trailer bed and said gooseneck to permit relative rotation of said gooseneck and trailer bed to lower the trailer bed, and e. safety hook means interconnected with said thrust bearing means, and being movable with said thrust bearing means to a first position where the safety hook means provides a positive interconnect between a rear portion of said gooseneck and a portion of said trailer bed rearwardly of said coupling means, and to a second position with said thrust bearing means where there is no engagement of said safety hook means between said gooseneck and trailer bed.

5. The apparatus as recited in claim 4, wherein said thrust bearing means and safety hook means are rotatably mounted to a common shaft, by means of which said thrust bearing means and safety hook means are rotated between their first and second positions.

6. The apparatus as recited in claim 5, wherein said thrust bearing means comprises a pair of bearing blocks and said safety hook means comprises a pair of safety hooks, said shaft being mounted to said gooseneck at a location above said trailer bearing means with said gooseneck and trailer bed being interconnected, said safety hooks and said bearing blocks being rotatable forwardly and upwardly to said second position.

7. In a trailer assembly including a trailer bed and a gooseneck, apparatus connecting one end of the trailer bed to the gooseneck, said apparatus comprising:

a. detachable coupling means interconnecting said trailer bed and said gooseneck at a first forward location at the one end of said trailer bed, b. hydraulic ram means having a first end connected to said gooseneck at a second location spaced from said first location, and having a second force transmitting end, c. bearing means on said trailer bed adapted to detachably engage the second end of said ram means so as to receive a thrust force imparted by said ram means, said bearing means being positioned at a third location spaced rearwardly of said coupling location, whereby said ram means and said coupling means provide a force couple for relative rotation of said gooseneck to said trailer bed, d. thrust bearing means, independent of said ram means, being movable between a first position where said thrust bearing means exerts a thrust force between a rear portion of said gooseneck and a bearing surface of said trailer bed positioned rearwardly of said coupling means, and a second position where said thrust bearing means is out of thrust engagement between said trailer bed and said gooseneck to permit relative rotation of said gooseneck and trailer bed to lower the trailer bed, e. said apparatus further characterized in that said coupling means comprises two paires of interengaging hook members, with said apparatus further comprising a pair of lock pins insertable into said hook members in a manner to prevent disengagement of said hook members, and f. each pair of hook members providing a locking recess to receive a related lock pin, said recess being so located that relative rotation of said gooseneck and said trailer bed upwardly from a normal operating position exposes said recesses for removal of said lock pins, while lowering of said gooseneck and trailer to said operating position closes said recesses to lodge said lock pins in locking relationship with said hook members.

8. In a trailer assembly including a trailer bed and a gooseneck, apparatus connecting one end of the trailer bed to the gooseneck, said apparatus comprising:

a. detachable coupling means interconnecting said trailer bed and said gooseneck at a first forward location at the one end of said trailer bed, b. hydraulic ram means having a first end connected to said gooseneck at a second location spaced from said first location, and having a second force transmitting end, c. bearing means on said trailer bed adapted to detachably engage the second end of said ram means so as to receive a thrust force imparted by said ram means, said bearing means being positioned at a third location spaced rearwardly of said coupling location, whereby said ram means and said coupling means provide a force couple for relative rotation of said gooseneck to said trailer bed, d. thrust bearing means, independent of said ram means, being movable between a first position where said thrust bearing means exerts a thrust force between a rear portion of said gooseneck and a bearing surface of said trailer bed positioned rearwardly of said coupling means, and a second position where said thrust bearing means is out of thrust engagement between said trailer bed and said gooseneck to permit relative rotation of said gooseneck and trailer bed to lower the trailer bed, and e. said apparatus being further characterized in that said ram means comprises a plurality of hydraulic rams, and said second force transmitting end of said ram means comprises a unitary member rigidly connected to said hydraulic rams, whereby the thrusts of said ram means is transmitted as a unitized thrust force to said bearing means, said unitary member comprising a T-shaped yoke having a lateral bar rigidly connected to said ram means, and a depending central bearing member engaging said bearing means.

9. The apparatus as recited in claim 8, wherein said bearing means comprises a pocket member, and the depending bearing member of the T-shaped yoke and the pocket member have aligned through openings located at an axis of rotation of said T-shaped member and said pocket member, and there is a retractable pin means insertable through said openings to releasably interconnect said T-shaped member with said pocket member.

10. In a trailer assembly including a trailer bed and a gooseneck, apparatus connecting one end of the trailer bed to the gooseneck, said apparatus comprising:

a. detachable coupling means interconnecting said trailer bed and said gooseneck at a first forward location at the one end of said trailer bed, b. hydraulic ram means having a first end connected to said gooseneck at a second location spaced from said first location, and having a second force transmitting end, c. bearing means on said trailer bed adapted to detachably engage the second end of said ram means so as to receive a thrust force imparted by said ram means, said bearing means being positioned at a third location spaced rearwardly of said coupling location, whereby said ram means and said coupling means provide a force couple for relative rotation of said gooseneck to said trailer bed, d. thrust bearing means, independent of said ram means, being movable between a first position where said thrust bearing means exerts a thrust force between a rear portion of said gooseneck and a bearing surface of said trailer bed positioned rearwardly of said coupling means, and a second position where said thrust bearing means is out of thrust engagement between said trailer bed and said gooseneck to permit relative rotation of said gooseneck and trailer bed to lower the trailer bed, and e. said apparatus further comprising safety hook means, and said thrust bearing means and safety hook means being rotatably mounted to a common shaft, by means of which said thrust bearing means and safety hook means are rotated between said first position where the safety hook means provide a positive interconnect between a rear portion of said gooseneck and a portion of said trailer bed rearwardly of said coupling means, and to said second position, where said thrust bearing means and said safety hook means are not in operative engagement between said gooseneck and said trailer, the coupling means of said apparatus comprising two pairs of interengaging hook members, and a pair of lock pins insertable into said hook members in a manner to prevent disengagement of said hook members.

11. The apparatus as recited in claim 10, wherein there are operating members for said hydraulic ram means, said thrust bearing means, said safety hook means, and said lock pins, said operating members being located laterally of said trailer assembly on one side thereof, for convenient and safe operation.

12. In a trailer assembly including a trailer bed and a gooseneck, apparatus connecting one end of the trailer bed to the gooseneck, said apparatus comprising:

a. detachable coupling means interconnecting said trailer bed and said gooseneck at a first forward location at the one end of said trailer bed, b. hydraulic ram means having a first end connected to said gooseneck at a second location spaced from said first location, and having a second force transmitting end, c. bearing means on said trailer bed adapted to detachably engage the second end of said ram means so as to receive a thrust force imparted by said ram means, said bearing means being positioned at a third location spaced rearwardly of said coupling location, whereby said ram means and said coupling means provide a force couple for relative rotation of said gooseneck to said trailer bed, d. thrust bearing means, independent of said ram means, being movable between a first position where said thrust bearing means exerts a thrust force between a rear portion of said gooseneck and a bearing surface of said trailer bed positioned rearwardly of said coupling means, and a second position where said thrust bearing means is out of thrust engagement between said trailer bed and said gooseneck to permit relative rotation of said gooseneck and trailer bed to lower the trailer bed, e. said ram means comprising a plurality of hydraulic rams, and said second force transmitting end of said ram means comprises a unitary member rigidly connected to said rams, whereby the thrust of said ram means is transmitted as a unitized thrust force to said bearing means, f. said unitary member comprising a T-shaped yoke having a lateral bar rigidly connected to said hydraulic rams, and a depending central bearing member engaging said bearing means, g. said bearing means comprising a pocket member, with the depending bearing member of the T-shaped yoke and the poket member having aligned through openings located at an axis of rotation of said T-shaped member with said pocket member, h. retractable pin means insertable through said openings to releasably interconnect said T-shaped member with said pocket member, and i. safety hook means interconnected with said thrust bearing means for unitary rotation about a common axis, said safety hook means being movable with said thrust bearing means about said common axis to a first position where the safety hook means provides a positive interconnect between a rear portion of said gooseneck and a portion of said trailer bed rearwardly of said coupling means, with said thrust bearing means being rotatably movable with said safety hook means upwardly and forwardly to said second position, where said thrust bearing means and said safety hook means are not in operative engagement between said gooseneck and said trailer.

* * * * *

UNITED STATES PATENT OFFICE
CERTIFICATE OF CORRECTION

Patent No. 3,866,947    Dated February 18, 1975

Inventor(s) Michael J. Yakubow

It is certified that error appears in the above-identified patent and that said Letters Patent are hereby corrected as shown below:

Column 3, line 10 after "nal", delete "T" and insert therefor -- I --.

Column 6, line 3, "dram" should be -- ram --.

Column 6, line 4, "beam" should be -- beams --.

Signed and sealed this 15th day of July 1975.

(SEAL)
Attest:

RUTH C. MASON
Attesting Officer

C. MARSHALL DANN
Commissioner of Patents
and Trademarks